US009575537B2

(12) United States Patent
Ignowski et al.

(10) Patent No.: US 9,575,537 B2
(45) Date of Patent: Feb. 21, 2017

(54) ADAPTIVE ALGORITHM FOR THERMAL THROTTLING OF MULTI-CORE PROCESSORS WITH NON-HOMOGENEOUS PERFORMANCE STATES

(71) Applicant: Intel Corporation, Santa Clara, CA (US)

(72) Inventors: James S. Ignowski, Fort Collins, CO (US); Matthew M. Bace, North Andover, MA (US); Eric J. Dehaemer, Shrewsbury, MA (US); Chris Poirier, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 14/340,802

(22) Filed: Jul. 25, 2014

(65) Prior Publication Data

US 2016/0026231 A1 Jan. 28, 2016

(51) Int. Cl.
*G06F 1/32* (2006.01)
*G06F 11/00* (2006.01)
*G06F 9/50* (2006.01)
*G06F 1/20* (2006.01)
*G06F 1/28* (2006.01)
(Continued)

(52) U.S. Cl.
CPC .............. *G06F 1/3206* (2013.01); *G06F 1/206* (2013.01); *G06F 9/5094* (2013.01); *G06F 1/26* (2013.01); *G06F 1/28* (2013.01); *G06F 1/324* (2013.01); *G06F 1/3275* (2013.01); *G06F 1/3293* (2013.01); *G06F 1/3296* (2013.01); *G06F 11/0754* (2013.01)

(58) Field of Classification Search
CPC .......... G06F 1/26; G06F 1/206; G06F 9/5094; G06F 11/0754; G06F 1/3275; G06F 1/28; G06F 1/3293
USPC ................................ 713/300; 714/47.1, 47.2
See application file for complete search history.

(56) References Cited

U.S. PATENT DOCUMENTS

| | | |
|---|---|---|
| 5,163,153 A | 11/1992 | Cole et al. |
| 5,522,087 A | 5/1996 | Hsiang |
| 5,590,341 A | 12/1996 | Matter |

(Continued)

FOREIGN PATENT DOCUMENTS

EP    1 282 030 A1    5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Ji H Bae
(74) *Attorney, Agent, or Firm* — Trop, Pruner & Hu, P.C.

(57) ABSTRACT

In an embodiment, a processor comprises: a plurality of cores each to execute instructions; a plurality of thermal sensors, at least one of which is associated with each of the cores; and a power control unit (PCU) coupled to the cores. The PCU includes a thermal control logic to preemptively throttle a first core by a first throttle amount when a temperature of a second core exceeds at least one thermal threshold. Note that this first core may be preemptively throttled independently of a throttling of the second core and may have a temperature of the first core does not exceed any thermal threshold. Other embodiments are described and claimed.

24 Claims, 14 Drawing Sheets

(51) Int. Cl.
*G06F 1/26* (2006.01)
*G06F 11/07* (2006.01)

(56) References Cited

U.S. PATENT DOCUMENTS

| | | | |
|---|---|---|---|
| 5,621,250 A | 4/1997 | Kim | |
| 5,931,950 A | 8/1999 | Hsu | |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,721,128 B2 * | 5/2010 | Johns | G01K 3/005 700/299 |
| 7,730,340 B2 | 6/2010 | Hu et al. | |
| 8,704,630 B2 * | 4/2014 | Melvin, Jr. | G05B 9/02 219/201 |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2005/0289376 A1 * | 12/2005 | Hartman | G06F 1/206 713/320 |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0149974 A1 * | 7/2006 | Rotem | G06F 1/206 713/300 |
| 2006/0161375 A1 * | 7/2006 | Duberstein | G06F 1/206 702/132 |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156370 A1 * | 7/2007 | White | G06F 1/206 702/132 |
| 2007/0156992 A1 | 7/2007 | Jahagirdar | |
| 2007/0191993 A1 * | 8/2007 | Wyatt | G11C 5/00 700/299 |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0073068 A1 * | 3/2010 | Cho | G05D 23/1934 327/513 |
| 2010/0115309 A1 | 5/2010 | Carvalho et al. | |
| 2010/0146513 A1 | 6/2010 | Song | |
| 2010/0169039 A1 * | 7/2010 | Hosokawa | G06F 1/206 702/136 |
| 2010/0191997 A1 | 7/2010 | Dodeja et al. | |
| 2011/0154090 A1 | 6/2011 | Dixon et al. | |
| 2012/0079290 A1 | 3/2012 | Kumar | |
| 2012/0246506 A1 | 9/2012 | Knight | |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2014/0068290 A1 | 3/2014 | Bhandaru et al. | |
| 2015/0370303 A1 * | 12/2015 | Krishnaswamy | G06F 1/3206 713/322 |

OTHER PUBLICATIONS

SPEC—Power and Performance, Design Overview V1.10, Standard Performance Information Corp., Oct. 21, 2008, 6 pages.
Intel Technology Journal, "Power and Thermal Management in the Intel Core Duo Processor," May 15, 2006, pp. 109-122.
Anoop Iyer, et al., "Power and Performance Evaluation of Globally Asynchronous Locally Synchronous Processors," 2002, pp. 1-11.
Greg Semeraro, et al., "Hiding Synchronization Delays in a GALS Processor Microarchitecture," 2004, pp. 1-13.
Joan-Manuel Parcerisa, et al., "Efficient Interconnects for Clustered Microarchitectures," 2002, pp. 1-10.
Grigorios Magklis, et al., "Profile-Based Dynamic Voltage and Frequency Scalling for a Multiple Clock Domain Microprocessor," 2003, pp. 1-12.
Greg Semeraro, et al., "Dynamic Frequency and Voltage Control for a Multiple Clock Domain Architecture," 2002, pp. 1-12.
Greg Semeraro, "Energy-Efficient Processor Design Using Multiple Clock Domains with Dynamic Voltage and Frequency Scaling," 2002, pp. 29-40.
Diana Marculescu, "Application Adaptive Energy Efficient Clustered Architectures," 2004, pp. 344-349.
L. Benini, et al., "System-Level Dynamic Power Management," 1999, pp. 23-31.
Ravindra Jejurikar, et al., "Leakage Aware Dynamic Voltage Scaling for Real-Time Embedded Systems," 2004, pp. 275-280.
Ravindra Jejurikar, et al., "Dynamic Slack Reclamation With Procrastination Scheduling in Real-Time Embedded Systems," 2005, pp. 13-17.
R. Todling, et al., "Some Strategies for Kalman Filtering and Smoothing," 1996, pp. 1-21.
R.E. Kalman, "A New Approach to Linear Filtering and Prediction Problems," 1960, pp. 1-12.
International Application No. PCT/US2012/028865, filed Mar. 13, 2012, entitled "Providing Efficient Turbo Operation of a Processor," by Intel Corporation.
International Application No. PCT/US2012/028902, filed Mar. 13, 2012, entitled "Dynamically Controlling Interconnect Frequency in a Processor," by Intel Corporation.
International Application No. PCT/US2012/028876, filed Mar. 13, 2012, entitled "Dynamically Computing an Electrical Design Point (EDP) for a Multicore Processor," by Intel Corporation.
Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

* cited by examiner

ADAPTIVE ALGORITHM FOR THERMAL THROTTLING OF MULTI-CORE PROCESSORS WITH NON-HOMOGENEOUS PERFORMANCE STATES

FIELD OF INVENTION

Embodiments relate to power and thermal management of a system, and more particularly to power and thermal management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
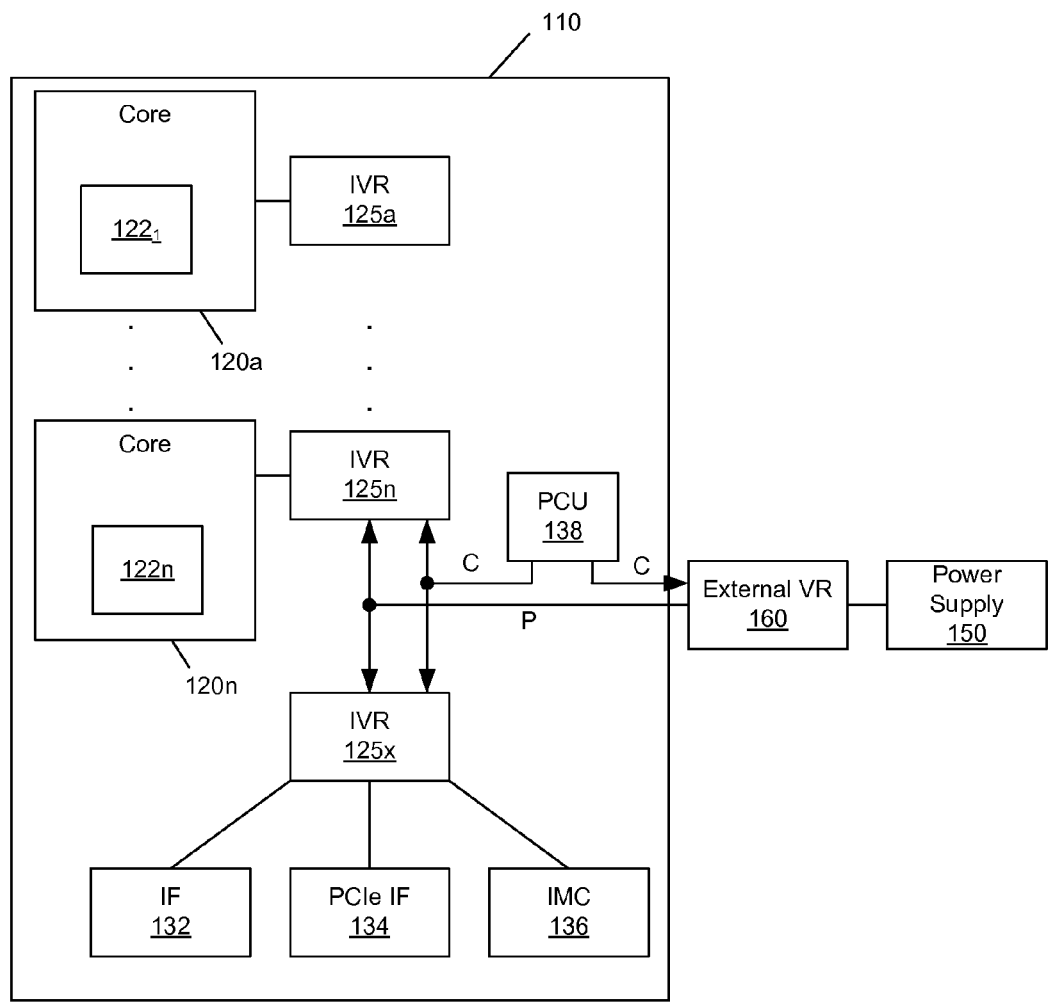
FIG. 1 is a block diagram of a system in accordance with one embodiment of the present invention.

In various embodiments, a processor such as a multicore processor, system on chip (SoC) or other such processor may provide adaptive control of one or more thermal mechanisms. As a result, each processing logic of the processor (e.g., a processor core, graphics processor and/or other such processing engines) may be independently thermally controlled. In this way, embodiments may avoid creation of hotspots within the processor and/or react quickly to the incidence of such hotspots to maintain high levels of performance while reducing the thermal events that can cause degradations in performance.

Per-core performance states (P-states) enable different cores of a multicore processor to run at different operating voltage/frequency points, which has the side effect of causing different levels of silicon heating to occur in the different cores. Because individual core operating points are dynamically adjusted by a mechanism that effectively allocates power budgets to different cores, as a given core heats up and is thermally throttled, an increase in power budget is available to other cores, potentially causing them to heat up and throttle. During this time, the first thermally throttled core has cooled down and can then effect an increase in P-state (and power) and overheat again. Depending on per-core workloads, this situation can occur across multiple cores as they all heat up, thermally throttle, and heat up again in a chaotic fashion. This sort of situation is colloquially referred to a "whack-a-mole" problem as different cores "pop up" in temperature, requiring thermal throttling, only to have other cores pop up, and can result in performance instability in systems utilizing a multicore processor.

Using an adaptive thermal throttling technique as described herein, increased performance is realized because each core's P-state is not severely limited by the hottest core; core temperatures are managed via a coordinated algorithm that adapts its response to the overall thermal profile of the processor. A hotter thermal profile of a processor leads to more aggressive throttling, with heaviest throttling for the hottest cores. In turn a processor having a cooler thermal profile (but still where at least one core is above the lowest temperature threshold) leads to less aggressive throttling, but still heavier throttling for the hottest cores. Instead when all cores are below the lowest temperature threshold, throttling is exited gracefully to avoid a quick return to a thermally throttling state. Such behavior provides hysteresis by adapting the throttle levels rather than adjusting the temperature thresholds.

As such in embodiments all cores of a microprocessor may be throttled independently, and at least slightly when any core is above a thermal threshold. In turn, hotter cores may be more aggressively throttled, which can effectively suppress an unstable intrinsic response in which cores pop in and out of throttle states.

According to various embodiments, a multi-pass adaptive technique may be performed based at least in part on a thermal state of each of the cores or other processing engines to determine whether one or more of these engines has exceeded one of multiple thermal thresholds. If so, independent and potentially different throttling techniques may be performed on both the offending engines (namely those engines exceeding a given thermal threshold) and the non-offending engines (namely those engines not exceeding any of the thermal thresholds). Note that this throttling of non-offending engines is thus a preemptive throttling. Furthermore, the hotter engines may be more aggressively throttled than the cooler engines that do not exceed any of the thermal thresholds.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. Each core 120 may include one or more corresponding thermal sensors $122_0$-$122_n$, to enable temperature or other thermal information to be used for thermal control as described herein. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include thermal control logic to independently and adaptively control throttling of one or more cores having different performance states.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, SoCs, and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the adaptive thermal control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P1 state. This P1 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth). Additional power consumption levels may be applied when a processor is under a constraint, e.g., a power and/or thermal constraint. In an embodiment, such states may include a C0 state with a minimal operating frequency and/or voltage (referred to herein as Pn or Pm states).

Embodiments may monitor an overall assessment of a thermal profile across cores or other processing engines of a processor or SoC and take appropriate throttling action, with the severity of the throttling being a function of the overall thermal profile. Hot cores are throttled heaviest, but once any has exceeded the temperature threshold all cores are preemptively lightly throttled. If the thermal profile continues to heat up, more aggressive action is taken on the hottest cores that exceed specified thermal thresholds, but the cooler cores are also throttled somewhat more to prevent them from crossing thermal thresholds and requiring aggressive throttling, which of course diminishes performance. By preemptively lightly throttling cores that are not over any thermal threshold, embodiments may maintain the highest performance possible within a thermal budget or envelope.

In an embodiment, a multiple-pass approach may be used, in which cores may be allocated or assessed values based on their temperature and/or temperature of the hottest core. Then based on assessed values, one or more cores may be thermally throttled, via performance state reduction for the throttled core(s) to realize a cooling benefit. Depending on temperature, different levels of throttling may be effected, where in one embodiment a reduction of one P-state corresponds to decreasing operating frequency by one frequency bin and decreasing operating voltage to a corresponding voltage in a voltage/frequency table. If a higher level of throttling is indicated, P-state may be reduced to either Pn (maximum frequency at minimum voltage (Vmin)) or Pm (minimum frequency), depending on the value of a configuration value.

Figure 2:
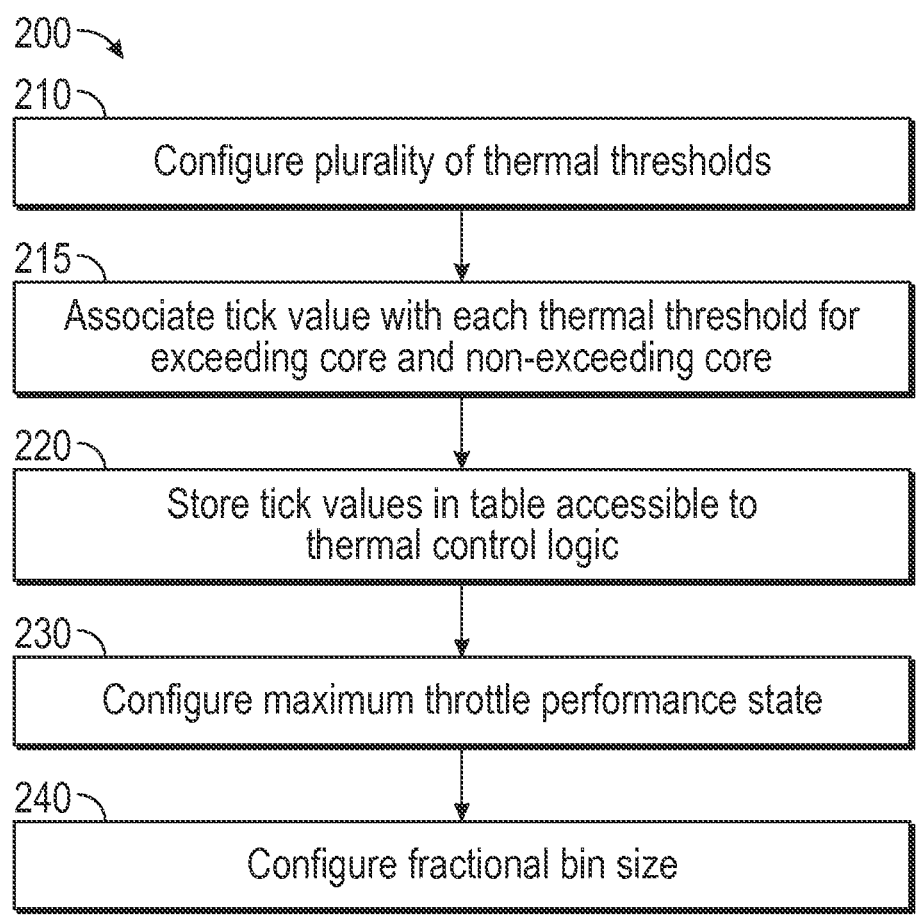
FIG. 2 is a flow diagram of a configuration method in accordance with an embodiment of the present invention.

Referring now to FIG. 2, shown is a flow diagram of a configuration method in accordance with an embodiment of the present invention. As shown in FIG. 2, method 200 may be performed by thermal control logic, which may be part of a power controller such as a PCU, in an embodiment. Of course understand that method 200 may be performed in other embodiments by different combinations of hardware, software, and/or firmware.

As seen, method 200 begins by configuring a plurality of thermal thresholds (block 210). In one embodiment, there are 4 thermal thresholds, all based on the effective throttle temperature threshold (tprochot_eff), which accounts for offsets introduced by other configuration parameters. In an embodiment, Tprochot_eff is the fused, guardbanded temperature threshold to be compared to actual measured temperature at thermal sensor locations, to guarantee the maximum operating temperature specification determined by thermal and reliability analysis of the product.):

$TP0=Tprochot\_eff-0.5°$ C.$-\&EARLY\_THROTT-LE\_OFFSET$ $TP1=Tprochot\_eff$ $TP2=Tprochot\_eff+1.0°$ C.

$TP3=Tprochot\_eff+\&OFFSET\_AT\_MAX\_THROTTLE$

In an embodiment, the offset terms may be configurable for tunability. The default values are 0.25° C. for &EARLY_THROTTLE_OFFSET, 3° C. for &OFFSET_AT_MAX_THROTTLE, and 4 for &THERMAL_LIMIT_FORMAT ("n" above), as an example. The additional 0.5° C. is to ensure the reported temperature is rounded down (when reported as an integer) to 1° C. below so throttling is initiated ahead of Tprochot_eff being reported externally. Of course understand that in other embodiments additional or different thresholds may be provided.

Next at block 215 a tick value may be associated with each thermal threshold for an exceeding core and a non-exceeding core (block 215). That is, as described above, in a first pass a certain amount of ticks or counts may be assessed to a core if it is over a given threshold. Furthermore, in a second pass tick values may also be assessed to all of the cores, so long as at least one core exceeds a given threshold.

Still referring to FIG. 2, next control passes to block 220 where the tick values may be stored in a table accessible to thermal control logic. For example, this tick assessment table may be stored in a storage of the thermal control logic or PCU. Next, at block 230 a maximum throttle performance state may be configured. This maximum throttle performance state may be a predetermined minimal performance state that all cores may be placed into when one or more cores exceeds a maximum thermal threshold, and in an embodiment may be a Pn or Pm state. Finally, method 200 may further be used to configure a fractional bin size (block 240). In an embodiment, this fractional bin size may correspond to a value of an assessed number of tick values at which a performance state change is to be effected. Using fractional bin reductions a selected number of count values or ticks are assessed to cores based on their thermal condition and/or thermal condition of a hottest processing engine.

In an embodiment, an adaptive thermal N-strike algorithm is implemented such that when N fractional bins are assessed to an engine, a performance change (e.g., of a bin level) may occur. In an embodiment a configurable constant sets the fractional bin size according to $2^{-n}$. Throttling is done by assessing ticks against cores in two passes: hot cores are assessed ticks in a first pass; and all cores are assessed ticks in a second pass if any hot core was found the first pass. As discussed above, in an embodiment of an N-strike adaptive algorithm, this fractional bin size N may be set to 4, where $2^N$ or 16 ticks or strikes may be assessed to a core before a performance state change (e.g., by a bin value) is effected.

At a selected evaluation interval (e.g., once per millisecond), the two passes of the adaptive thermal algorithm may analyze temperature of each core, and in the first pass assess ticks to each core that meets a first thermal threshold (e.g., TP0) or higher. In the second pass, all cores (including those having a temperature below TP0) are assessed a number of ticks based on the highest thermal threshold exceeded during the first pass. These ticks are accumulated across evaluation intervals and when a core reaches $2^n$ ticks (16 by default) it will drop by one P-state (frequency bin). Refer to Table 1, which is an example tick assessment table in accordance with one embodiment of the present invention.

TABLE 1

|  | TP0 | TP1 | TP2 | TP3 |
|---|---|---|---|---|
| Hot core | 1 | 3 | 12 | Go to PM/PN |
| All cores | 1 | 1 | 4 | Go to PM/PN |

Note that the hot cores are assessed ticks in both passes, while cores having a temperature below TP1 are only assessed ticks in the second pass. The tick values in the assessment table are implemented as configurable variables for tunability so different part configurations (package, integrated heat spreader, die size, etc.) can be accommodated. As an example, the "All cores" entry at its "TP0" field may be set to zero so that cool cores are not assessed any ticks until at least one core has exceeded at least the TP1 thermal threshold. In the embodiment of Table 1, the default values of the tick assessment table ensure that cores exceeding TP2 will drop one bin each (since $2^{-4}=1/16$ of a bin per tick and cores exceeding TP2 are assessed 12+4=16 ticks per evaluation interval). And when any core exceeds the highest thermal threshold (TP3), all cores are throttled to a minimum performance level.

An adaptive technique as described herein ensures that cores that are warm (e.g., close to Tprochot_eff) will be lightly (slowly) throttled while hotter cores are more heavily throttled, thereby addressing the individual hot spot most urgently but also throttling other cores to avoid a "whack-a-mole" type problem with different cores popping up as hot when the hot cores have dropped enough bins for P-state increases to occur to other cores.

If all cores are below the lowest thermal threshold (e.g., TP0), then each core recovers a predetermined number of ticks (which may be configurable, and in an embodiment may be 4) during each evaluation interval every evaluation interval (default value is 4). When an original tick count is recovered, throttling is released, and performance state increases may begin.

Example #1 (with reference to Table 1): core A between TP1 and TP2, core B between TP1 and TP1, all other cores below TP0. The resulting tick assessments per evaluation interval are:
Core A=4 ticks (¼ bin)
Core B=2 ticks (⅛ bin)
All other cores=1 tick (1/16 bin)

Example #2 (with reference to Table 1): core A between TP2 and TP3, all other cores below TP0. The resulting tick assessments per evaluation interval are:
Core A=16 ticks (1 bin)
All other cores=4 ticks (¼ bin)

Figure 3A:
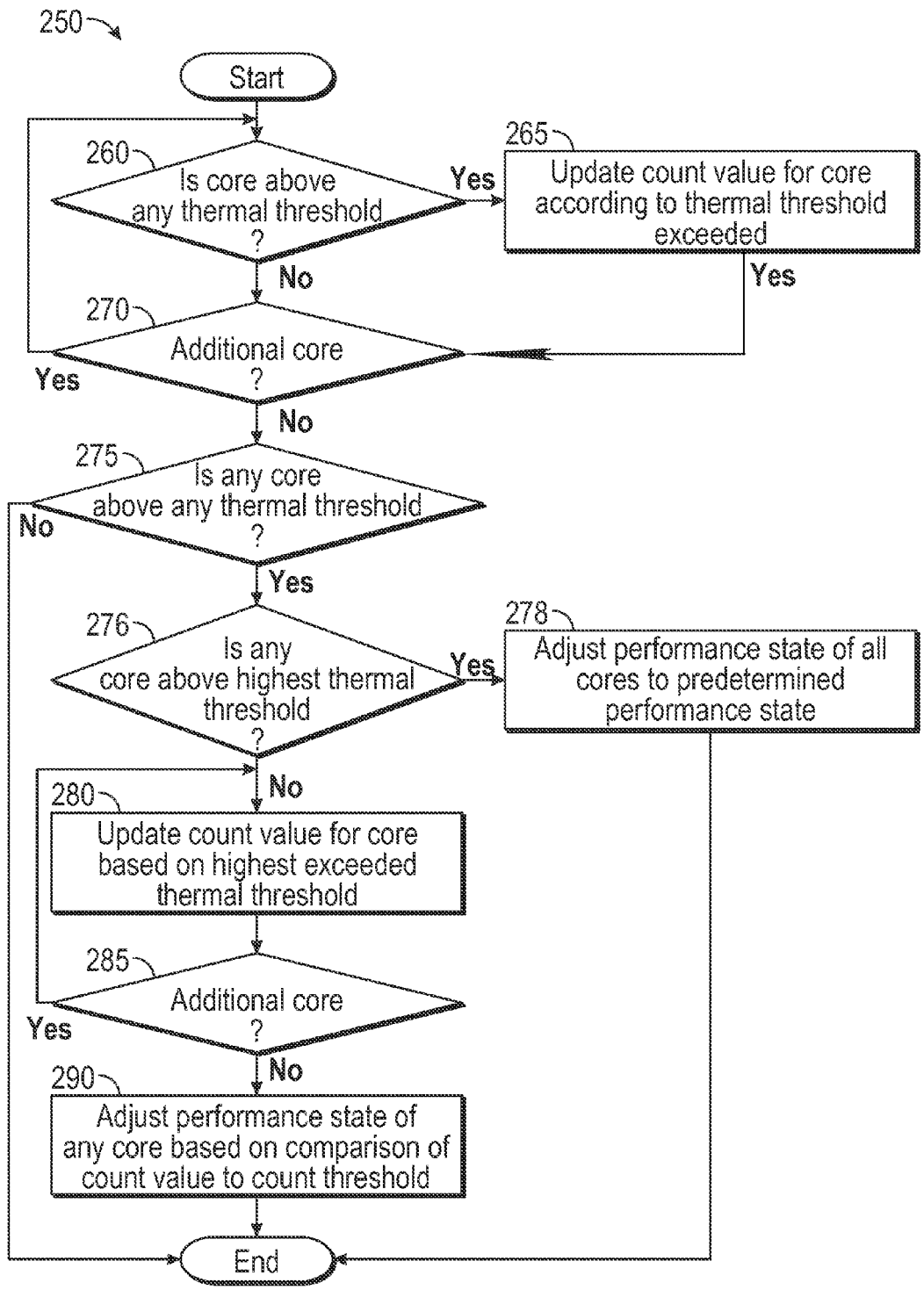
FIG. 3A is a flow diagram of a method for performing an adaptive thermal control technique in accordance with an embodiment.

Referring now to FIG. 3A, shown is a flow diagram of a method for performing an adaptive thermal control technique in accordance with an embodiment. Method 250 may be performed, at least in part, by a thermal control logic in an embodiment. Some of the operations also may be performed by a PCU or other power controller. As seen, method 250 begins in a first pass by determining whether a given core has a temperature that exceeds any thermal threshold (diamond 260). As in the discussion above, there may be a plurality of such thresholds, e.g., 4 thresholds. If so, control passes to block 265, where a count or tick value for the core may be updated. More specifically, this count value may be updated according to the highest thermal threshold that the core has exceeded, e.g., with reference to a tick assessment table. When the processor is getting hotter and cores exceed higher thermal thresholds, the update may be a decrement by the appropriate tick value (and vice versa, in a decrementing implementation). Control next passes to diamond 270 to determine whether additional cores are to be analyzed. Control also passes to diamond 270 directly from diamond 260 if a given core does not exceed any of the thermal thresholds. This loop of the first pass continues for additional cores of the processor. Furthermore, understand that while for ease of discussion reference is with regard to the cores of a multicore processor, the same operations may be performed for any processing engine of the processor.

Still referring to FIG. 3A, after the first pass above, additional operations may be performed as a second pass of the adaptive thermal control technique in which additional assessments may be made based on the temperature of other cores. More specifically at diamond 275 it is determined whether any core has a temperature that is above one or more of the thermal thresholds. If no core is above any threshold, method 250 may conclude, as no throttling is needed.

Next at diamond 276 it may be determined whether any core has a temperature that exceeds the highest thermal threshold. If so, control passes to block 278 where the performance state of all cores may be adjusted. More specifically, all cores may be adjusted to a predetermined performance state corresponding to the configured maximum throttle performance level, e.g., Pn or Pm.

Otherwise, control passes to block 280 where the count value for a core may be updated based on the highest exceeded thermal threshold (by any core). As above, this updating may be based on information in the tick assessment table (and may be a decrement as cores become hotter, in an embodiment). Next control passes to diamond 285 to determine whether additional cores are to be analyzed in this second pass. If so, control passes back to block 280. If not, control passes to block 290 where a performance state of a core may be adjusted based on a comparison of a count value and a count threshold. More specifically, the thermal control logic may issue a throttle signal to a power controller to cause a throttling, e.g., by a bin value when a count threshold is met (e.g., when the count value is zero, in a decrementing implementation). In embodiments, instead when a processor is cooling and an original count value is fully reloaded, an increase by a bin value (e.g.,) may occur. To this end a performance increase signal may be issued to the power controller. Although shown at this high level in the embodiment of FIG. 3A, understand the scope of the present invention is not limited in this regard and many variations and alternatives of an adaptive throttling technique are possible.

Figure 3B:
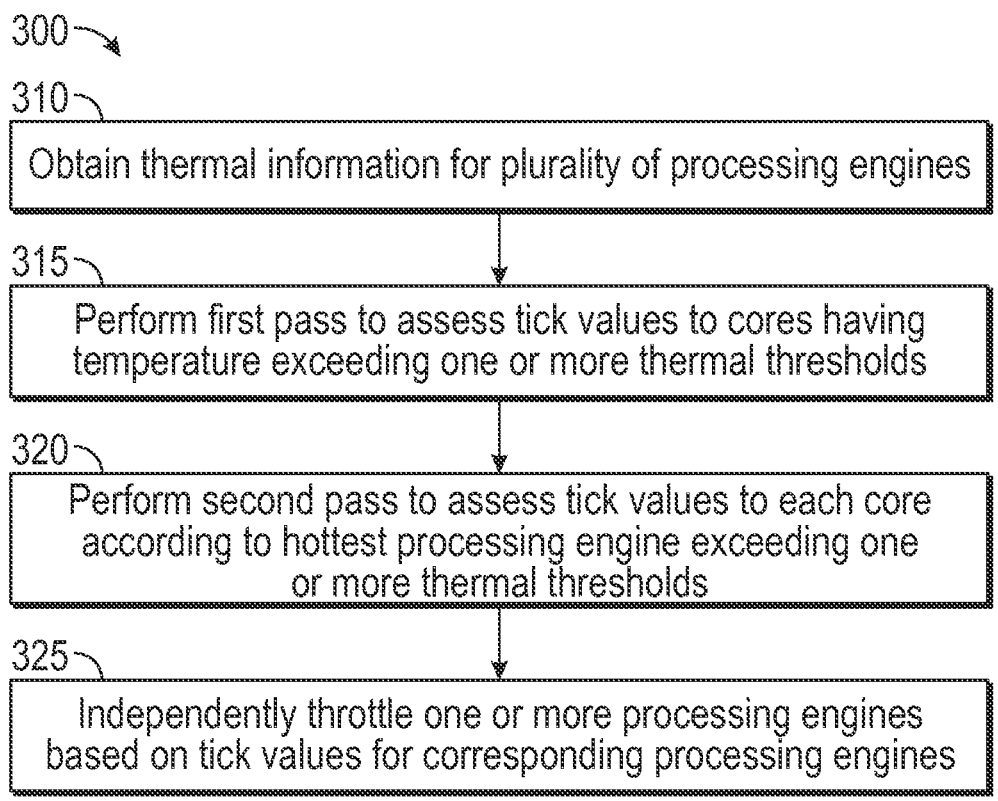
FIG. 3B is a flow diagram of an adaptive thermal control method in accordance with another embodiment.

Referring now to FIG. 3B, shown is a flow diagram of an adaptive thermal control method in accordance with another embodiment. Method 300 may be performed by a throttle control logic and/or power controller. As seen, method 300 begins by obtaining thermal information for a plurality of processing engines (block 310). This thermal information may be received from various sensors within the processor. For example, in a multicore processor each core or other processing engine may have one or more thermal sensors associated therewith, e.g., within the core itself or closely located thereto. Next, control passes to block 315 where a first pass of the control method is performed. More specifically in this first pass tick values may be assessed to processing engines that have a temperature that exceeds one or more of the thermal thresholds. As discussed above, the assessment of tick values may be based on information within the tick assessment table and the given thermal threshold that has been exceeded by the processing engine.

Referring still to FIG. 3B, control next passes to block 320 where a second pass of the control method is performed. More specifically, a tick value may be assessed to each core according to the hottest processing engine that has exceeded one or more threshold. Again, this assessment may be with reference to the tick assessment table and a given threshold that the hottest processing engine has exceeded. Finally, at block 325 one or more of the processing engines may be independently throttled. More specifically, based on the count values for the corresponding processing engines, throttle signals may be generated for any processing engine having a value that meets the throttle criteria. For example, in a decrementing implementation, a throttle signal may be triggered for any processing engine having a count value of zero or less. Instead in an incrementing implementation, the throttle signal may be triggered for a given core when the counter value overflows or exceeds a given threshold. Understand that the throttle signal may be sent to additional power control logic that may cause a performance state change, e.g., a decrementing of the performance state (such as by 1 bin value) responsive to the throttle signal. Instead when a processor cools, a performance increase signal may be sent when a performance increase criteria is met (e.g., an original count value is reloaded in a decrementing implementation, or a zero or negative value occurs in an incrementing implementation). Understand that while shown at this high level in the embodiment of FIG. 3B, many variations and alternatives are possible.

Figure 4:
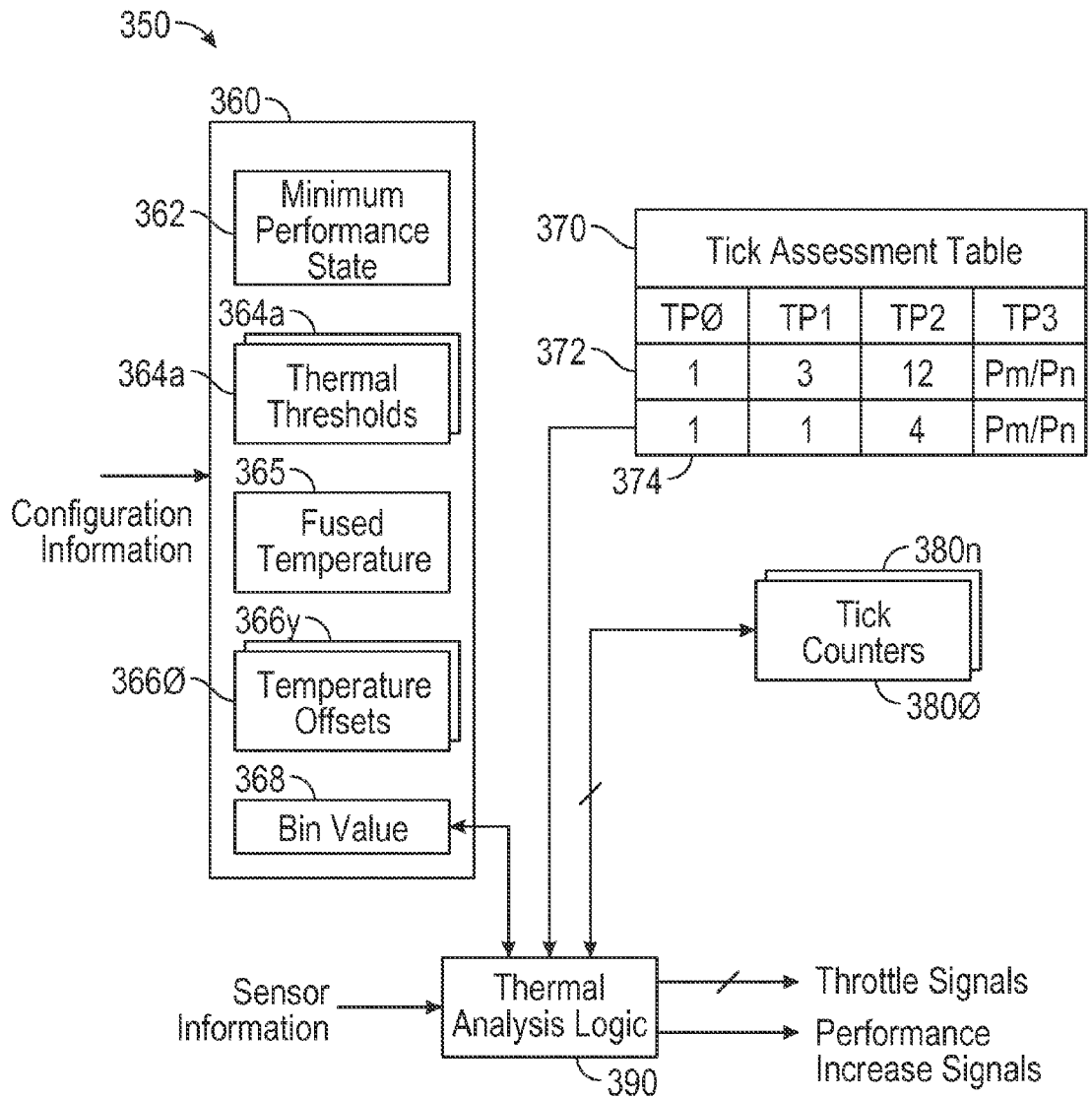
FIG. 4 is a block diagram of a thermal control logic in accordance with an embodiment of the present invention.

Referring now to FIG. 4, shown is a block diagram of a thermal control logic in accordance with an embodiment of the present invention. As shown in FIG. 4, thermal control logic 350 may be implemented in circuitry of a processor, e.g., within a power control unit or other processor circuitry. As seen, a configuration storage 360 is present and may be configured to store various configuration information, which may be programmable or fused. In some embodiments, at least some of the information stored within configuration storage 360 may be received via BIOS. In the embodiment shown, storage 360 includes a minimum performance state storage 362, which may store an indication of a minimum performance state (also described above as the maximum throttle performance state) in which one or more cores or other processing engines are to be placed when a highest thermal threshold is exceeded by one or more cores. Configuration storage 360 further includes a plurality of thermal threshold storages $364_0$-$364_x$. As an example, thermal thresholds TP0-TP3 may be stored here. Alternately or in addition, a fused temperature storage 365 may store a maximum specified temperature at which the processor is allowed to operate, and which may be set by an original equipment manufacturer. In addition, a plurality of thermal offset storages $366_0$-$366_y$ may be present. In some embodiments using a combination of the fused temperature stored in storage 365 and the offsets in offset storages 366, the thermal thresholds may be generated independently. That is, in some embodiments the fused value and offsets may be used to generate thermal thresholds without the need for their independent storage in the configuration storage. Configuration storage 360 also includes a bin value storage 368 which may store a bin value, e.g., corresponding to a number of tick values at which a performance bin change is to occur (which may be the fractional bin size or count threshold described above).

As further shown in FIG. 4, a tick assessment table 370 is provided. In an embodiment, tick assessment table 370 may include a plurality of entries 372 and 374. Each entry may include multiple tick values each associated with a given thermal threshold. In some embodiments the information in tick assessment table 370 may be populated using configuration information received from BIOS or another system software. Or in some embodiments such values may be fused into tick assessment table 370. Note that entry 372 stores tick assessment values to be assessed for cores that exceed a given thermal threshold, while entry 374 stores tick assessment values to be assessed for all cores when at least one core exceeds a given one of the thermal thresholds.

Still referring to FIG. 3, thermal control logic 350 further includes a plurality of counters $380_0$-$380_n$. Each of these tick counters may be associated with a core or other processing engine, and in a decrementing implementation, each may be configured with an original count value when cores do not exceed any thermal thresholds. In operation, thermal analysis logic 390 may update the corresponding tick counters when one or more cores exceeds one or more of the thermal thresholds, using information in tick assessment table 370. When a given core has a count value that is less than a count threshold (e.g., zero) in a decrementing implementation, a throttle signal may be communicated from thermal analysis logic 390, e.g., to a power controller to cause the corresponding core to be throttled. Instead when an original count value is restored for a counter of a corresponding core, a performance increase signal may be sent. Although shown with this particular implementation in FIG. 4, understand the scope of the present invention is not limited in this regard.

Figure 5:
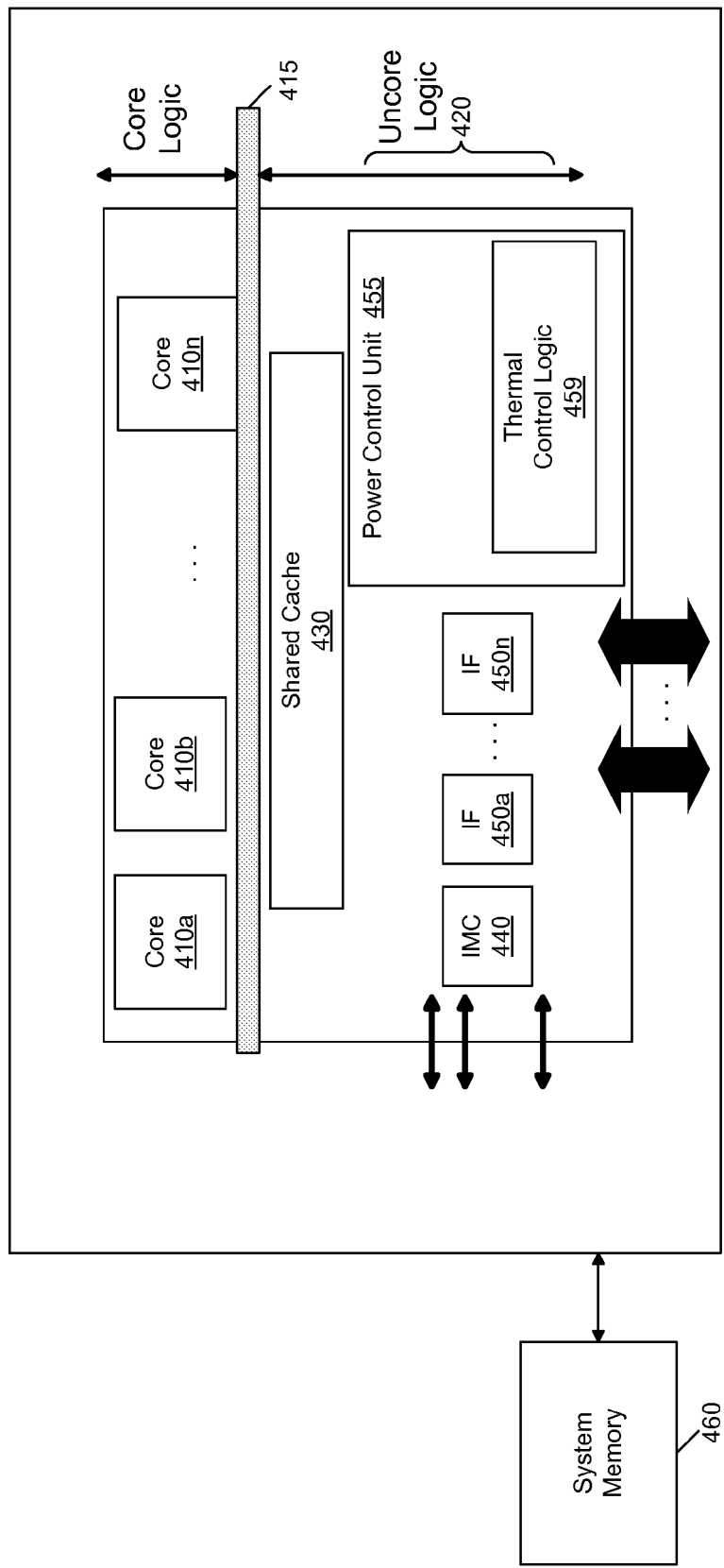
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455. In various embodiments, power control unit 455 may include a thermal control logic 459 in accordance with an embodiment of the present invention. Cores or other engines can be independently and adaptively thermally controlled such that hotter cores are more aggressively throttled and cooler cores are less aggressively throttled. In addition, logic 459 may perform preemptive throttling of one or more cores even when such cores have not exceeded any thermal threshold, when at least one other core of the processor has exceeded a thermal threshold.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
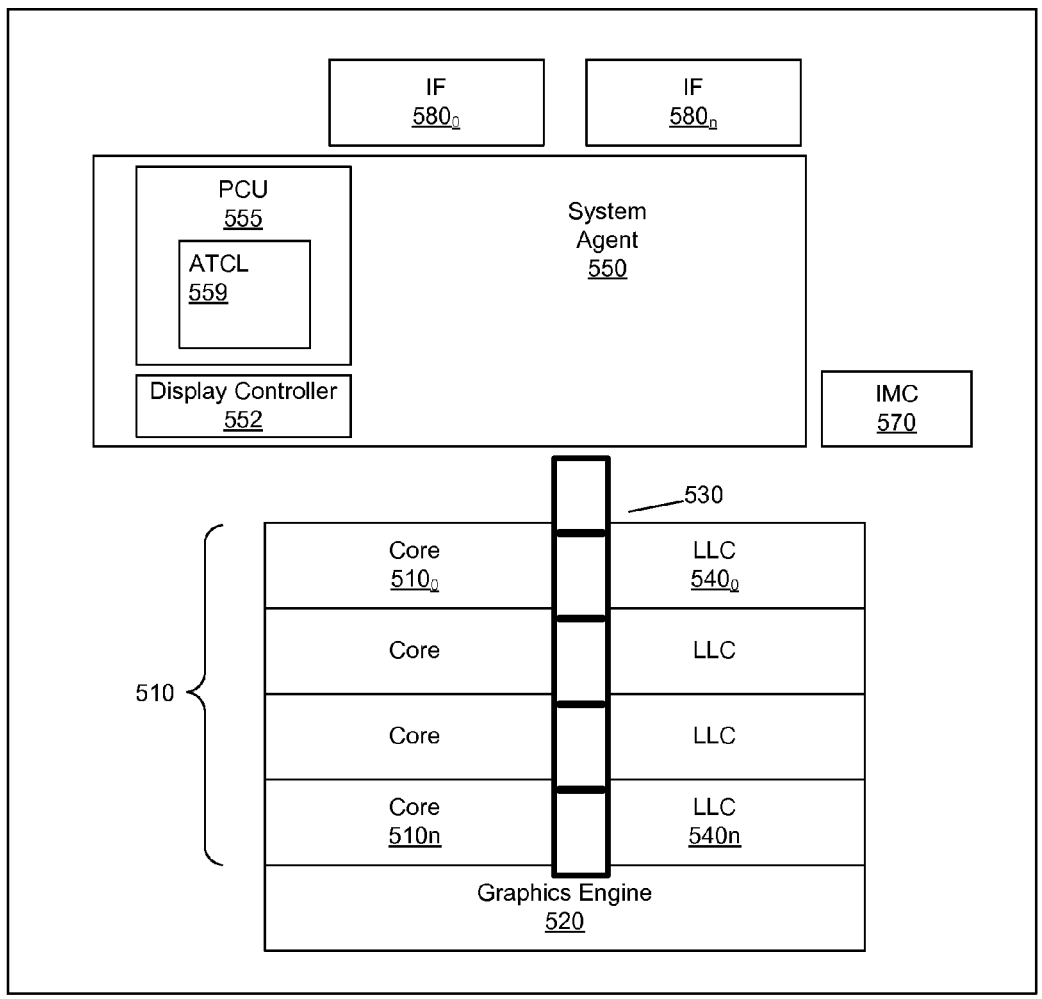
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include an adaptive thermal control logic 559 in accordance with an embodiment of the present invention to dynamically control performance states of one or more cores in an independent and adaptive manner based on thermal information, as described herein. In various embodiments, this logic may execute the algorithms described above in FIGS. 2A, 2B and 3.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 7:
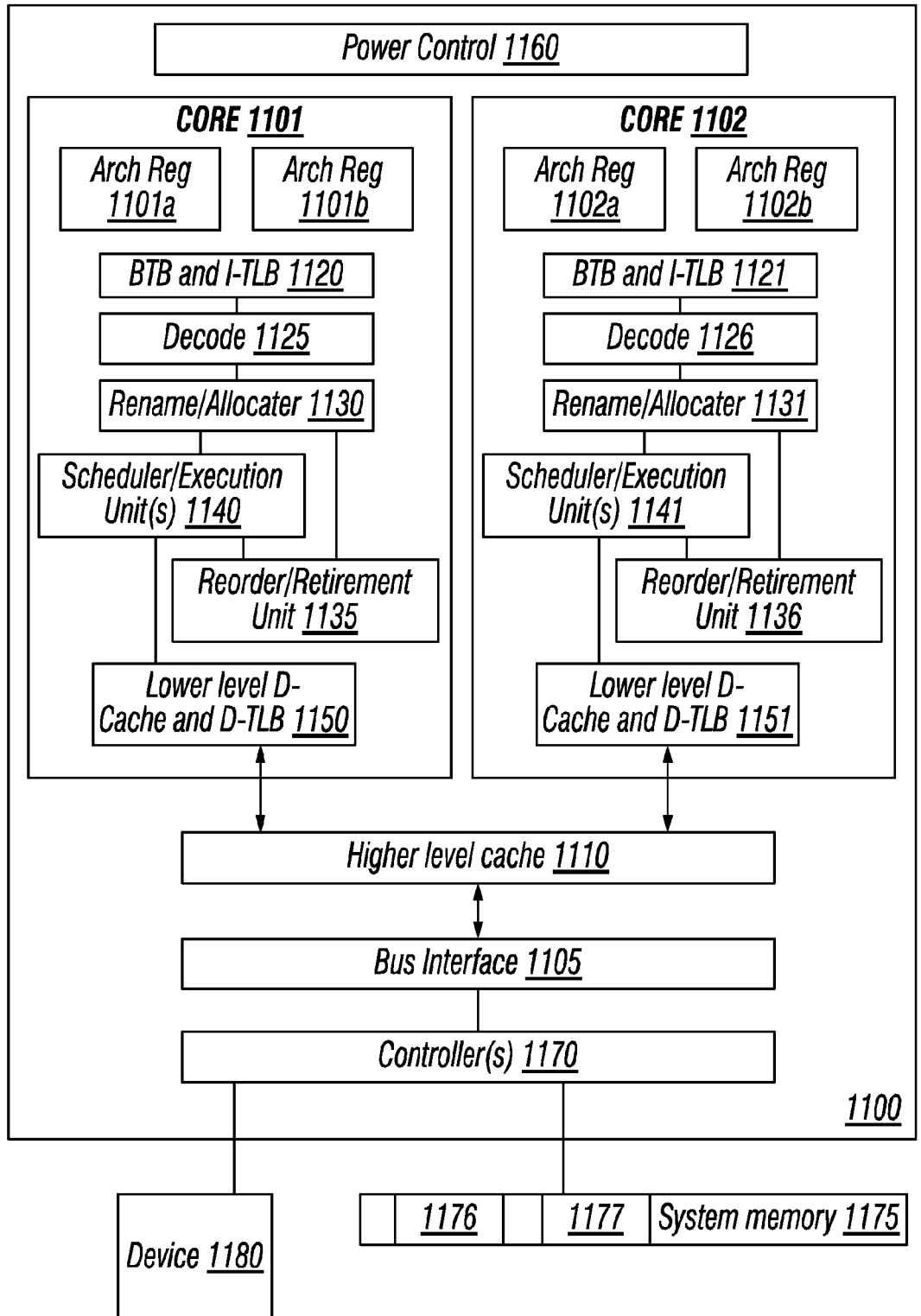
FIG. 7 is a block diagram of a processor including multiple cores in accordance with an embodiment of the present invention.

Referring to FIG. 7, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 7, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 8:
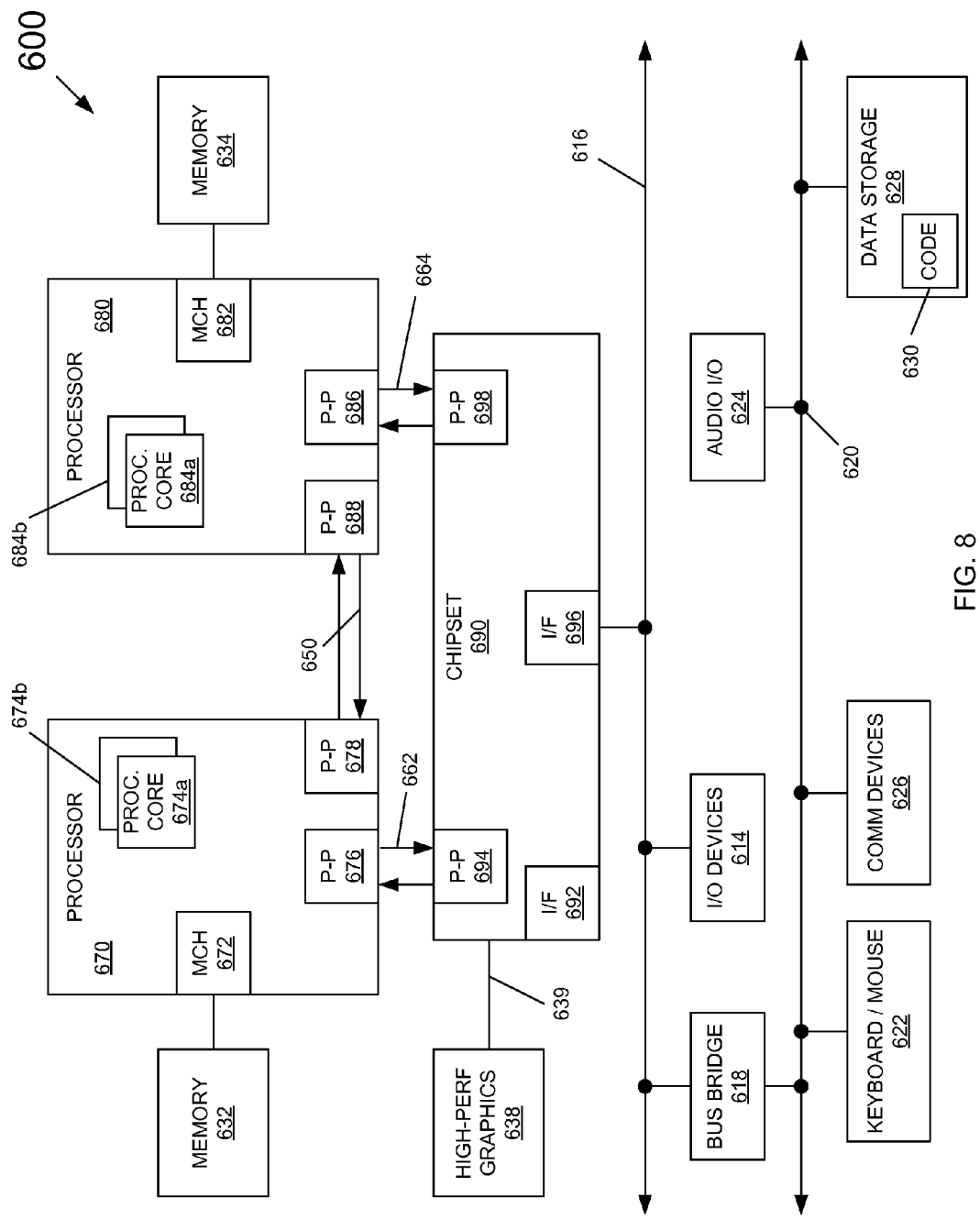
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to independently and preemptively throttle performance of one or more cores when at least one other core has exceeded a given thermal threshold. In addition, such logic may throttle all cores to a minimum performance state when a temperature of at least one of the cores has exceeded a highest thermal threshold level, as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 9:
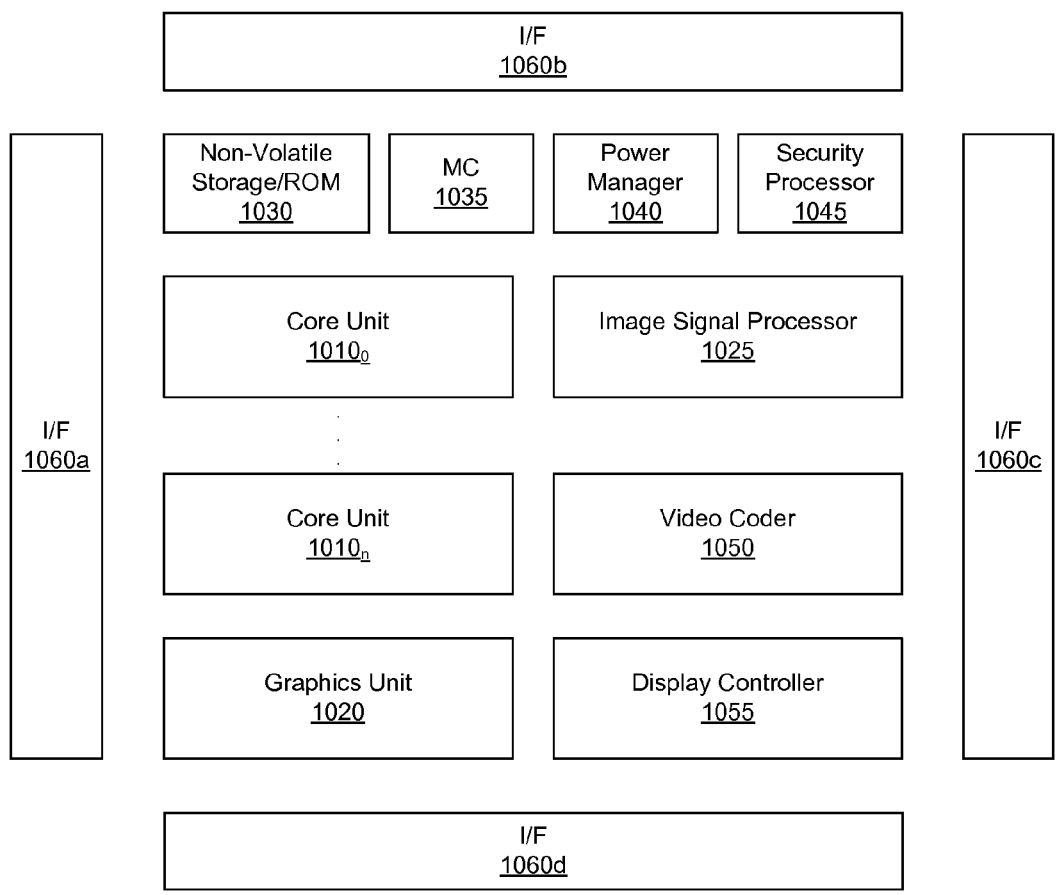
FIG. 9 is a block diagram of a processor in accordance with another embodiment of the present invention.

Referring now to FIG. 9, shown is a block diagram of a processor in accordance with another embodiment of the present invention. In the embodiment of FIG. 9, processor 1000 may be a system on a chip (SoC) including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 9, processor 1000 includes a plurality of core units $1010_0$-$1010_n$. Each core unit may include one or more processor cores, one or more cache memories and other circuitry. Each core unit 1010 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory. A non-volatile storage 1030 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a dynamic random access memory (DRAM) (not shown for ease of illustration in FIG. 9).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip. Other accelerators also may be present. In the illustration of FIG. 9, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth.

Each of the units may have its power consumption controlled via a power manager 1040. Power manager 1040 includes adaptive thermal control logic to perform independent and adaptive thermal control of multiple cores and other processing engines, as described herein.

In some embodiments, SoC 1000 may further include a non-coherent fabric coupled to the coherent fabric to which various peripheral devices may couple. One or more interfaces 1060a-1060d enable communication with one or more off-chip devices. Such communications may be according to a variety of communication protocols such as PCIe™, GPIO, USB, I2C, UART, MIPI, SDIO, DDR, SPI, HDMI, among other types of communication protocols. Although shown at this high level in the embodiment of FIG. 9, understand the scope of the present invention is not limited in this regard.

Figure 10:
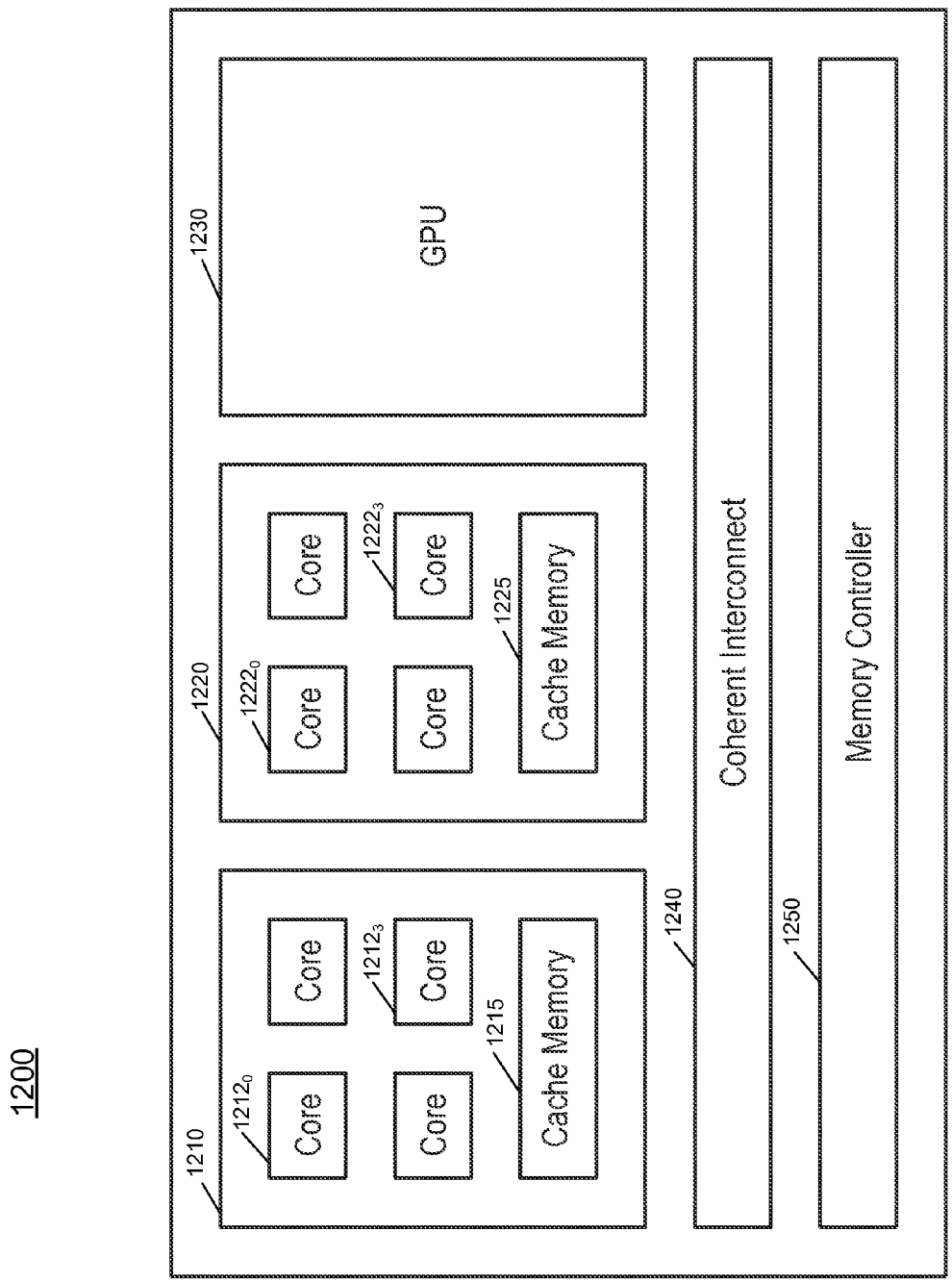
FIG. 10 is a block diagram of a representative SoC in accordance with an embodiment of the present invention.

Referring now to FIG. 10, shown is a block diagram of a representative SoC. In the embodiment shown, SoC 1200 may be a multi-core SoC configured for low power operation to be optimized for incorporation into a smartphone or other low power device such as a tablet computer or other portable computing device. As an example, SoC 1200 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design available from ARM Holdings, LTD., Sunnyvale, Calif. In yet other embodiments, a mix of Intel and ARM cores may be implemented in a given SoC.

As seen in FIG. 10, SoC 1200 includes a first core domain 1210 having a plurality of first cores $1212_0$-$1212_3$. In an example, these cores may be low power cores such as in-order cores. In one embodiment these first cores may be implemented as ARM Cortex A53 cores. In turn, these cores couple to a cache memory 1215 of core domain 1210. In addition, SoC 1200 includes a second core domain 1220. In the illustration of FIG. 10, second core domain 1220 has a plurality of second cores $1222_0$-$1222_3$. In an example, these cores may be higher power-consuming cores than first cores 1212. In an embodiment, the second cores may be out-of-order cores, which may be implemented as ARM Cortex A57 cores. In turn, these cores couple to a cache memory 1225 of core domain 1220. Note that while the example shown in FIG. 10 includes 4 cores in each domain, understand that more or fewer cores may be present in a given domain in other examples.

With further reference to FIG. 10, a graphics domain 1230 also is provided, which may include one or more graphics processing units (GPUs) configured to independently execute graphics workloads, e.g., provided by one or more cores of core domains 1210 and 1220. As an example, GPU domain 1230 may be used to provide display support for a variety of screen sizes, in addition to providing graphics and display rendering operations.

As seen, the various domains couple to a coherent interconnect 1240, which in an embodiment may be a cache coherent interconnect fabric that in turn couples to an integrated memory controller 1250. Coherent interconnect 1240 may include a shared cache memory, such as an L3 cache, some examples. In an embodiment, memory controller 1250 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1220 including higher power cores may have fewer numbers of such cores. For example, in one implementation two cores 1222 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
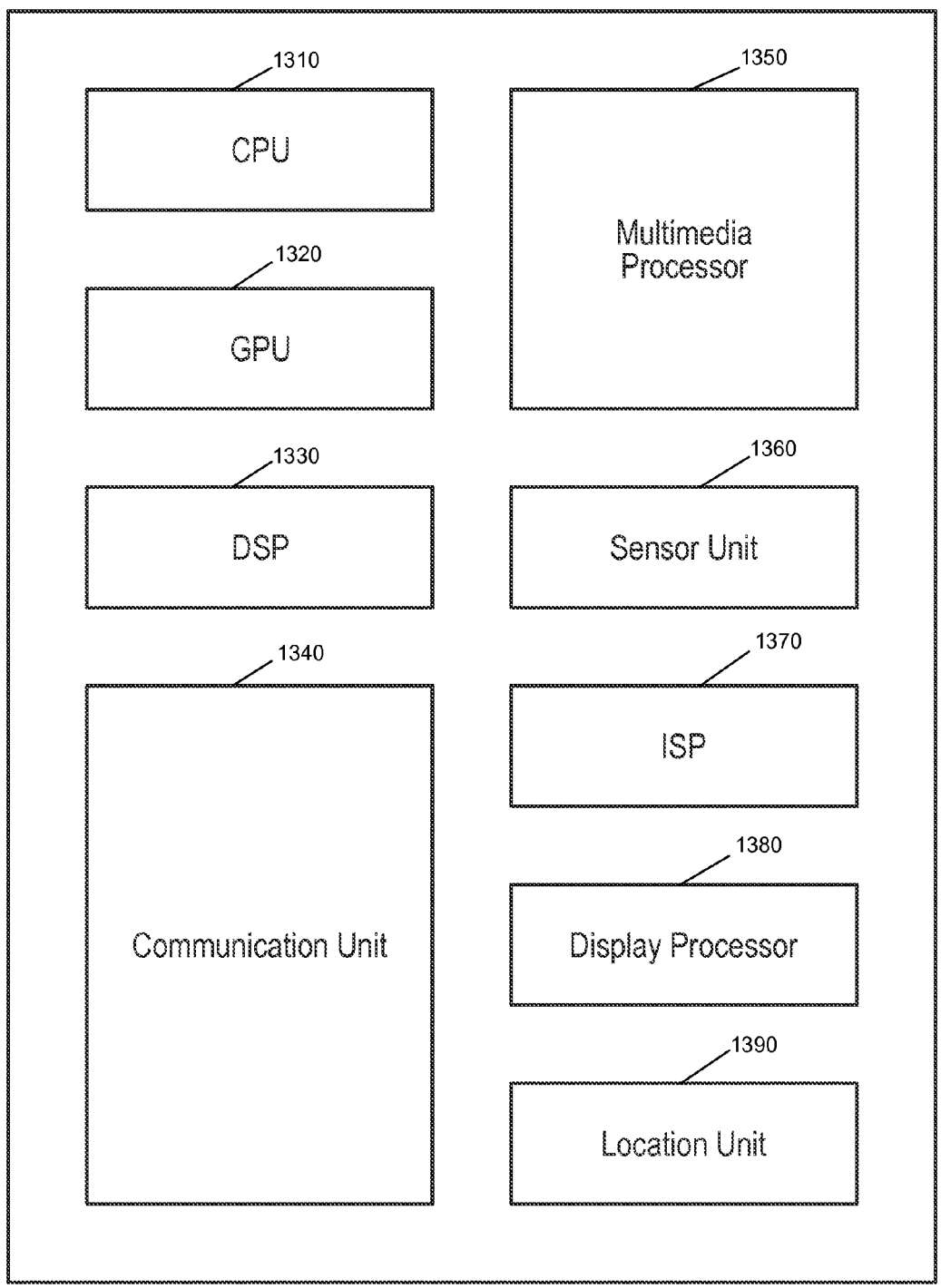
FIG. 11 is a block diagram of another example SoC in accordance with another embodiment of the present invention.

Referring now to FIG. 11, shown is a block diagram of another example SoC. In the embodiment of FIG. 11, SoC 1300 may include various circuitry to enable high performance for multimedia applications, communications and other functions. As such, SoC 1300 is suitable for incorporation into a wide variety of portable and other devices, such as smartphones, tablet computers, smart TVs and so forth. In the example shown, SoC 1300 includes a central processor unit (CPU) domain 1310. In an embodiment, a plurality of individual processor cores may be present in CPU domain 1310. As one example, CPU domain 1310 may be a quad core processor having 4 multithreaded cores. Such processors may be homogeneous or heterogeneous processors, e.g., a mix of low power and high power processor cores.

In turn, a GPU domain 1320 is provided to perform advanced graphics processing in one or more GPUs to handle graphics and compute APIs. A DSP unit 1330 may provide one or more low power DSPs for handling low-power multimedia applications such as music playback, audio/video and so forth, in addition to advanced calculations that may occur during execution of multimedia instructions. In turn, a communication unit 1340 may include various components to provide connectivity via various wireless protocols, such as cellular communications (including 3G/4G LTE), wireless local area techniques such as Bluetooth™, IEEE 802.11, and so forth.

Still further, a multimedia processor 1350 may be used to perform capture and playback of high definition video and audio content, including processing of user gestures. A sensor unit 1360 may include a plurality of sensors and/or a sensor controller to interface to various off-chip sensors present in a given platform. An image signal processor 1370 may be provided with one or more separate ISPs to perform image processing with regard to captured content from one or more cameras of a platform, including still and video cameras.

A display processor 1380 may provide support for connection to a high definition display of a given pixel density, including the ability to wirelessly communicate content for playback on such display. Still further, a location unit 1390 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
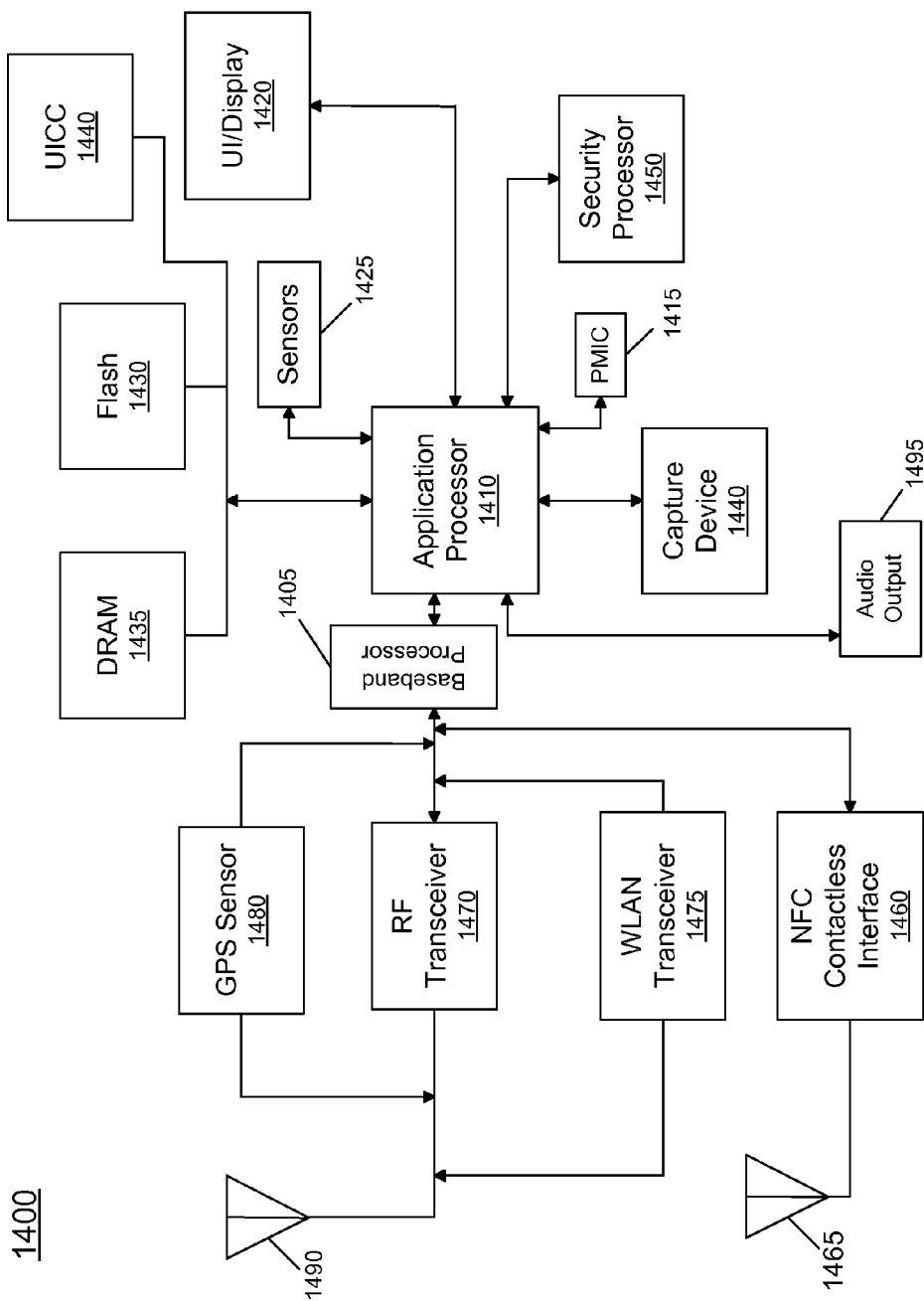
FIG. 12 is a block diagram of an example system with which embodiments can be used.

Referring now to FIG. 12, shown is a block diagram of an example system with which embodiments can be used. As seen, system 1400 may be a smartphone or other wireless communicator. A baseband processor 1405 is configured to perform various signal processing with regard to communication signals to be transmitted from or received by the system. In turn, baseband processor 1405 is coupled to an application processor 1410, which may be a main CPU of the system to execute an OS and other system software, in addition to user applications such as many well-known social media and multimedia apps. Application processor 1410 may further be configured to perform a variety of other computing operations for the device.

In turn, application processor 1410 can couple to a user interface/display 1420, e.g., a touch screen display. In addition, application processor 1410 may couple to a memory system including a non-volatile memory, namely a flash memory 1430 and a system memory, namely a dynamic random access memory (DRAM) 1435. As further seen, application processor 1410 further couples to a capture device 1440 such as one or more image capture devices that can record video and/or still images.

Still referring to FIG. 12, a universal integrated circuit card (UICC) 1440 comprising a subscriber identity module and possibly a secure storage and cryptoprocessor is also coupled to application processor 1410. System 1400 may further include a security processor 1450 that may couple to application processor 1410. A plurality of sensors 1425 may couple to application processor 1410 to enable input of a variety of sensed information such as accelerometer and other environmental information. An audio output device 1495 may provide an interface to output sound, e.g., in the form of voice communications, played or streaming audio data and so forth.

As further illustrated, a near field communication (NFC) contactless interface 1460 is provided that communicates in a NFC near field via an NFC antenna 1465. While separate antennae are shown in FIG. 12, understand that in some implementations one antenna or a different set of antennae may be provided to enable various wireless functionality.

A power management integrated circuit (PMIC) 1415 couples to application processor 1410 to perform platform level power management. To this end, PMIC 1415 may issue power management requests to application processor 1410 to enter certain low power states as desired. Furthermore, based on platform constraints, PMIC 1415 may also control the power level of other components of system 1400.

To enable communications to be transmitted and received, various circuitry may be coupled between baseband processor 1405 and an antenna 1490. Specifically, a radio frequency (RF) transceiver 1470 and a wireless local area network (WLAN) transceiver 1475 may be present. In general, RF transceiver 1470 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1480 may be present. Other wireless communications such as receipt or transmission of radio signals, e.g., AM/FM and other signals may also be provided. In addition, via WLAN transceiver 1475, local wireless communications, such as according to a Bluetooth™ standard or an IEEE 802.11 standard such as IEEE 802.11a/b/g/n can also be realized.

Figure 13:
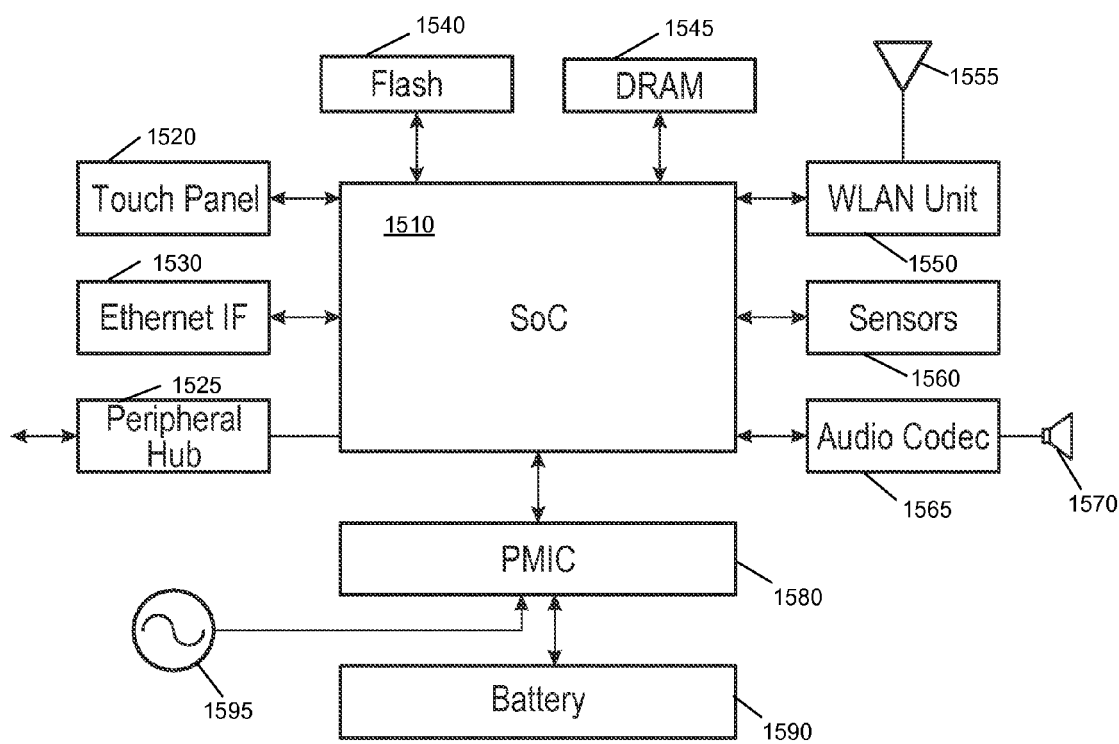
FIG. 13 is a block diagram of another example system with which embodiments may be used.

Referring now to FIG. 13, shown is a block diagram of another example system with which embodiments may be used. In the illustration of FIG. 13, system 1500 may be mobile low-power system such as a tablet computer, 2:1 tablet, phablet or other convertible or standalone tablet system. As illustrated, a SoC 1510 is present and may be configured to operate as an application processor for the device.

A variety of devices may couple to SoC 1510. In the illustration shown, a memory subsystem includes a flash memory 1540 and a DRAM 1545 coupled to SoC 1510. In addition, a touch panel 1520 is coupled to the SoC 1510 to provide display capability and user input via touch, including provision of a virtual keyboard on a display of touch panel 1520. To provide wired network connectivity, SoC 1510 couples to an Ethernet interface 1530. A peripheral hub 1525 is coupled to SoC 1510 to enable interfacing with various peripheral devices, such as may be coupled to system 1500 by any of various ports or other connectors.

In addition to internal power management circuitry and functionality within SoC 1510, a PMIC 1580 is coupled to SoC 1510 to provide platform-based power management, e.g., based on whether the system is powered by a battery 1590 or AC power via an AC adapter 1595. In addition to this power source-based power management, PMIC 1580 may further perform platform power management activities based on environmental and usage conditions. Still further, PMIC 1580 may communicate control and status information to SoC 1510 to cause various power management actions within SoC 1510.

Still referring to FIG. 13, to provide for wireless capabilities, a WLAN unit 1450 is coupled to SoC 1410 and in turn to an antenna 1455. In various implementations, WLAN unit 1450 may provide for communication according to one or more wireless protocols, including an IEEE 802.11 protocol, a Bluetooth™ protocol or any other wireless protocol.

As further illustrated, a plurality of sensors 1560 may couple to SoC 1510. These sensors may include various accelerometer, environmental and other sensors, including user gesture sensors. Finally, an audio codec 1565 is coupled to SoC 1510 to provide an interface to an audio output device 1570. Of course understand that while shown with this particular implementation in FIG. 13, many variations and alternatives are possible.

As there is overhead associated with a core changing P-states, either due to throttling or increased power budget, embodiments having an adaptive thermal control may reduce such P-state changes, and thus reduce rapid performance state changes, which can lead to an increased overhead tax and further penalize processor performance. Note that in some case, e.g., where thermal throttle events are initiated in an uncore portion of a processor, the described adaptive thermal throttle algorithm may be bypassed and one or more cores may be caused to immediately enter a maximum throttle state (e.g., the same behavior as when the TP3 threshold is met).

The adaptive thermal N-strike algorithm disclosed herein thus assesses ticks or strikes, with N representing the adaptive value which triggers a change in P-state. The multi-pass approach to assessing ticks may be implemented efficiently and with greater stability than managing thermals independently for each core and performing a cross-core throttling mechanism. Further, using an embodiment, a processor may be controlled to operate near a high temperature throttle threshold, and continue to see the benefit of power management technology and not lose performance unnecessarily due to entering a thermally unstable state. In this way, overall system power/performance efficiency may be increased by allowing users to be less aggressive in speeding up other platform components such as fans which consume much platform power, without incurring a heavy performance price if temperature reaches a thermal threshold. Still further, with a bypass technique, embodiments also do not compromise thermal protection and failsafe measures taken in response to more serious over temperature situations.

The following examples pertain to further embodiments.

In one example, a processor comprises: a plurality of cores each to execute instructions; a plurality of thermal sensors, at least one of the plurality of thermal sensors associated with each of the plurality of cores; and a PCU coupled to the plurality of cores. The PCU may include a thermal control logic to preemptively throttle a first core by a first throttle amount when a temperature of a second core exceeds at least one thermal threshold, and the first core may be preemptively throttled independently of a throttling of the second core, even when a temperature of the first core does not exceed any thermal threshold.

In an example, the thermal control logic is to throttle the second core by a second throttle amount, the second throttle amount more aggressive than the first throttle amount.

In an example, the thermal control logic is to update a first counter associated with the first core with a first tick value based on a highest thermal threshold of a plurality of thermal thresholds that the temperature of second core exceeds.

In an example, the thermal control logic is to cause a performance state reduction of the first core based on comparison of a value of the first counter to a threshold.

In an example, the thermal control logic is to cause a performance state increase of the first core if the value of the first counter reaches an original value.

In an example, the thermal control logic is to update a second counter associated with the second core with the first tick value and a second tick value based on the highest thermal threshold that the temperature of the second core exceeds.

In an example, the processor further comprises a table to store a plurality of first tick values each associated with one of the plurality of thermal thresholds and a plurality of second tick values each associated with one of the plurality of thermal thresholds.

In an example, the thermal control logic is to update a counter associated with a core with one of the plurality of first tick values when a temperature of the core exceeds the corresponding thermal threshold and to update the counter with one of the plurality of second tick values when a temperature of a hottest core of the plurality of cores exceeds one of the plurality of thermal thresholds.

In an example, the thermal control logic is to throttle the plurality of cores to a minimum performance state if a temperature of at least one of the plurality of cores exceeds a highest one of the plurality of thermal thresholds.

In an example, the processor further comprises a configuration storage to store a control indicator for the minimum performance state to cause the minimum performance state to be one of a minimum operating frequency and a maximum operating frequency at a minimum operating voltage.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: obtaining thermal information for a plurality of processing engines of a processor; assessing one of a first plurality of tick values to each of the plurality of processing engines having a temperature exceeding one or more thermal thresholds; assessing one of a second plurality of tick values to each of the plurality of processing engines according to a highest one of the plurality of thermal thresholds exceeded by a hottest one of the plurality of processing engines; and independently throttling one or more of the plurality of processing engines based on the assessed tick values for the corresponding processing engine.

In an example, the method further comprises throttling a first processing engine by reducing a performance state of the first processing engine by at least one performance level and throttling a second processing engine by reducing a performance state of the second processing engine by assessing the one of the second plurality of tick values to the second processing engine, where the first processing engine exceeds at least one of the one or more thermal thresholds and the second processing engine does not exceed any of the one or more thermal thresholds.

In an example, the method further comprises increasing a performance state of the first processing engine by a performance level when an original count value associated with the first processing engine is restored.

In an example, the method further comprises: assessing a first tick value to a first processing engine when a second processing engine exceeds a first thermal threshold; and assessing the first tick value and a second tick value to the second processing engine when the second processing engine exceeds the first thermal threshold.

In an example, throttling the first processing engine comprises reducing a performance state of the first processing engine and/or reducing the performance state by a bin value based on a comparison between a count of assessed tick values for the first processing engine and a threshold.

In an example, throttling the first processing engine comprises reducing the performance state by a bin value when a number of fractional strikes corresponding to 2–n have been assessed to the first processing engine.

In an example, the method further comprises: assessing the one of the first plurality of tick values based on information in a first entry of a tick assessment table; and assessing the one of the second plurality of tick values based on information in a second entry of the tick assessment table.

In an example, the method further comprises reducing a performance level of the plurality of processing engines to a minimal performance level when at least one processing engine exceeds the highest one of the plurality of thermal thresholds.

In an example, the method further comprises throttling a first processing engine by a first throttle amount, and throttling a second processing engine by a second throttle amount, the second throttle amount greater than the first throttle amount, where the second processing engine exceeds at least one of the one or more thermal thresholds and the first processing engine does not exceed any of the one or more thermal thresholds.

In another example, a computer readable medium including instructions is to perform the method of any of the above examples.

In another example, an apparatus comprises means for performing the method of any one of the above examples.

In another example, a system comprises: a processor having a plurality of processing engines including a plurality of cores and at least one graphics engine, a configuration storage to store a plurality of thermal thresholds, an assessment table to store a first plurality of assessment values and a second plurality of assessment values, a plurality of counters each associated with one of the plurality of processing engines, and a thermal analysis logic to update a counter of the plurality of counters associated with a first processing engine according to one of the first plurality of assessment values if the first processing engine exceeds at least one of the plurality of thermal thresholds and to update the counter according to one of the second plurality of assessment values based on a highest thermal threshold exceeded by a temperature of a hottest one of the plurality of processing engines. The system may further include a DRAM coupled to the processor.

In an example, the system further comprises a power controller to throttle the plurality of processing engines to a minimum performance state if a temperature of at least one of the plurality of processing engines exceeds a highest one of the plurality of thermal thresholds.

In an example, the power controller is to preemptively throttle a first core by a first throttle amount when a temperature of a second core exceeds one of the plurality of thermal thresholds, where a temperature of the first core does not exceed any of the plurality of thermal thresholds.

In an example, the power controller is to preemptively throttle the first core by the first throttle amount and throttle the second core by a second throttle amount, the second throttle amount greater than the first throttle amount.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
  a plurality of cores each to execute instructions;
  a plurality of thermal sensors, at least one of the plurality of thermal sensors associated with each of the plurality of cores; and
  a power control unit (PCU) coupled to the plurality of cores, wherein the PCU includes a thermal control logic to execute instructions stored in a non-transitory storage to preemptively throttle a first core by a first throttle amount when a temperature of a second core exceeds at least one thermal threshold, wherein the first core is to be preemptively throttled independently of a throttling of the second core when a temperature of the first core does not exceed any thermal threshold.

2. The processor of claim 1, wherein the thermal control logic is to throttle the second core by a second throttle amount, the second throttle amount more aggressive than the first throttle amount.

3. The processor of claim 1, wherein the thermal control logic is to update a first counter associated with the first core with a first tick value based on a highest thermal threshold of a plurality of thermal thresholds that the temperature of second core exceeds.

4. The processor of claim 3, wherein the thermal control logic is to cause a performance state reduction of the first core based on comparison of a value of the first counter to a threshold.

5. The processor of claim 4, wherein the thermal control logic is to cause a performance state increase of the first core if the value of the first counter reaches an original value.

6. The processor of claim 3, wherein the thermal control logic is to update a second counter associated with the second core with the first tick value and a second tick value based on the highest thermal threshold that the temperature of the second core exceeds.

7. The processor of claim 3, further comprising a second non-transitory storage to store a table to store a plurality of first tick values each associated with one of the plurality of thermal thresholds and a plurality of second tick values each associated with one of the plurality of thermal thresholds.

8. The processor of claim 7, wherein the thermal control logic is to update a counter associated with a core with one of the plurality of first tick values when a temperature of the core exceeds a corresponding thermal threshold and to update the counter with one of the plurality of second tick values when a temperature of a hottest core of the plurality of cores exceeds one of the plurality of thermal thresholds.

9. The processor of claim 1, wherein the thermal control logic is to throttle the plurality of cores to a minimum performance state if a temperature of at least one of the plurality of cores exceeds a highest one of the plurality of thermal thresholds.

10. The processor of claim 9, further comprising a configuration storage to store a control indicator for the minimum performance state to cause the minimum performance state to be one of a minimum operating frequency and a maximum operating frequency at a minimum operating voltage.

11. A non-transitory machine readable medium having stored thereon instructions, which if performed by a machine cause the machine to perform a method comprising:
  obtaining thermal information for a plurality of processing engines of a processor;
  assessing one of a first plurality of tick values to each of the plurality of processing engines having a temperature exceeding one or more thermal thresholds;
  assessing one of a second plurality of tick values to each of the plurality of processing engines according to a highest one of the one or more thermal thresholds exceeded by a hottest one of the plurality of processing engines; and
  independently throttling one or more of the plurality of processing engines based on the assessed tick values for the one or more of the plurality of processing engines.

12. The non-transitory machine readable medium of claim 11, wherein the method further comprises throttling a first processing engine by reducing a performance state of the first processing engine by at least one performance level and throttling a second processing engine by reducing a performance state of the second processing engine by assessing the one of the second plurality of tick values to the second processing engine, wherein the first processing engine exceeds at least one of the one or more thermal thresholds and the second processing engine does not exceed any of the one or more thermal thresholds.

13. The non-transitory machine readable medium of claim 12, wherein the method further comprises increasing a performance state of the first processing engine by a performance level when an original count value associated with the first processing engine is restored.

14. The non-transitory machine readable medium of claim 11, wherein the method further comprises:
  assessing a first tick value to a first processing engine when a second processing engine exceeds a first thermal threshold; and
  assessing the first tick value and a second tick value to the second processing engine when the second processing engine exceeds the first thermal threshold.

15. The non-transitory machine readable medium of claim 12, wherein throttling the first processing engine comprises reducing a performance state of the first processing engine.

16. The non-transitory machine readable medium of claim 15, wherein throttling the first processing engine comprises reducing the performance state by a bin value based on a comparison between a count of assessed tick values for the first processing engine and a threshold.

17. The non-transitory machine readable medium of claim 16, wherein throttling the first processing engine comprises reducing the performance state by a bin value when a number of fractional strikes corresponding to $2^n$ have been assessed to the first processing engine.

18. The non-transitory machine readable medium of claim 11, wherein the method further comprises:

assessing the one of the first plurality of tick values based on information in a first entry of a tick assessment table; and assessing the one of the second plurality of tick values based on information in a second entry of the tick assessment table.

19. The non-transitory machine readable medium of claim 11, wherein the method further comprises reducing a performance level of the plurality of processing engines to a minimal performance level when at least one processing engine exceeds the highest one of the plurality of thermal thresholds.

20. The non-transitory machine readable medium of claim 11, wherein the method further comprises throttling a first processing engine by a first throttle amount, and throttling a second processing engine by a second throttle amount, the second throttle amount greater than the first throttle amount, wherein the second processing engine exceeds at least one of the one or more thermal thresholds and the first processing engine does not exceed any of the one or more thermal thresholds.

21. A system comprising:
a processor having:
a plurality of processing engines including a plurality of cores and at least one graphics engine;
a non-transitory configuration storage to store a plurality of thermal thresholds;
an assessment table to store a first plurality of assessment values and a second plurality of assessment values;
a plurality of counters each associated with one of the plurality of processing engines; and
a thermal analysis logic to execute instructions stored in a non-transitory storage to update a counter of the plurality of counters associated with a first processing engine according to one of the first plurality of assessment values if the first processing engine exceeds at least one of the plurality of thermal thresholds and to update the counter according to one of the second plurality of assessment values based on a highest thermal threshold exceeded by a temperature of a hottest one of the plurality of processing engines; and a dynamic random access memory (DRAM) coupled to the processor.

22. The system of claim 21, further comprising a power controller to throttle the plurality of processing engines to a minimum performance state if a temperature of at least one of the plurality of processing engines exceeds a highest one of the plurality of thermal thresholds.

23. The system of claim 22, wherein the power controller is to preemptively throttle a first core by a first throttle amount when a temperature of a second core exceeds one of the plurality of thermal thresholds, wherein a temperature of the first core does not exceed any of the plurality of thermal thresholds.

24. The system of claim 23, wherein the power controller is to preemptively throttle the first core by the first throttle amount and throttle the second core by a second throttle amount, the second throttle amount greater than the first throttle amount.

* * * * *